United States Patent
Weinberger

[19]

[11] Patent Number: 6,136,196
[45] Date of Patent: Oct. 24, 2000

[54] DEVICE FOR CONTROLLING, GUIDING, ADJUSTING, MEASURING AND MONITORING LIQUID FLOWS, AND WATER TREATMENT FACILITY

[75] Inventor: Helmut Weinberger, Gundelfingen, Germany

[73] Assignee: Grunbeck Wasseraufbereitung GmbH, Hochstadt, Germany

[21] Appl. No.: 09/155,886

[22] PCT Filed: Jan. 23, 1998

[86] PCT No.: PCT/EP98/00372

§ 371 Date: Oct. 5, 1998

§ 102(e) Date: Oct. 5, 1998

[87] PCT Pub. No.: WO98/34717

PCT Pub. Date: Aug. 13, 1998

[30] Foreign Application Priority Data

Feb. 7, 1997 [DE] Germany .................... 197 04 656

[51] Int. Cl.⁷ .................................................. B01D 65/00
[52] U.S. Cl. ................ 210/650; 137/597; 137/884; 210/85; 210/143; 210/321.6; 210/541
[58] Field of Search ..................... 137/594, 597, 137/798, 269, 271, 884, 1, 136, 418; 210/85, 87, 90, 96.2, 143, 321.6, 321.78, 232, 324, 257.2, 258, 650, 739, 416.1, 541, 542; 258/232

[56] References Cited

U.S. PATENT DOCUMENTS

| | | | |
|---|---|---|---|
| 5,045,197 | 9/1991 | Burrows | 210/321.78 |
| 5,122,265 | 6/1992 | Mora et al. | 210/134 |
| 5,560,393 | 10/1996 | Clack | 210/257.2 |
| 5,660,720 | 8/1997 | Walling | 210/541 |
| 5,662,793 | 9/1997 | Beall | 210/90 |

FOREIGN PATENT DOCUMENTS

| | | |
|---|---|---|
| 0 272 632 | 6/1988 | European Pat. Off. . |
| 0 347 297 | 12/1989 | European Pat. Off. . |
| 0 676 573 A1 | 10/1995 | European Pat. Off. . |
| 1 062 506 | 7/1959 | Germany . |
| 21 19 224 | 11/1972 | Germany . |
| 2 207 982 | 2/1989 | United Kingdom . |

*Primary Examiner*—Joseph W. Drodge
*Attorney, Agent, or Firm*—George W. Neuner; Dike, Bronstein, Roberts, Cushman, LLP

[57] ABSTRACT

An apparatus for directing, controlling, regulating and monitoring flowing liquids, in particular for a membrane-type water conditioning apparatus, is provided, whereby a channel system for the flowing liquid is formed by means of a first body (1) having a surface (2), a plurality of recesses (10a, 10b, 10c, . . . ) provided at the surface and forming channel portions for a flowing liquid and a second body (4) which is non-rotationally connected to the first body and tightly separates the recesses (10a, 10b, 10c, . . . ) from the surroundings, and an inlet and outlet (A, B, C, D, E, F, G, H) for the liquid communicating with the channel portions. This design achieves, in comparison with a conventional pipework, a particularly compact construction. Moreover, a water conditioning apparatus comprising such an apparatus is provided.

22 Claims, 3 Drawing Sheets

DEVICE FOR CONTROLLING, GUIDING, ADJUSTING, MEASURING AND MONITORING LIQUID FLOWS, AND WATER TREATMENT FACILITY

This application is a 371 of PCT/EP98/00372 filed on Jan. 23, 1998.

The invention relates to an apparatus for directing, controlling, measuring and monitoring liquid streams, in particular for a membrane-type water conditioning apparatus, and to a water conditioning apparatus.

In a membrane-type water conditioning apparatus, for example a water conditioning apparatus operating according to the principle of reverse osmosis, untreated water is passed over a synthetic membrane under high pressure. The substances present in the water are selectively retained by the membrane, whereby the water is separated into pure water (permeate) and water containing the retained substances (concentrate).

In known membrane-type water treatment apparatus the liquid streams are passed through tubes, whereby the functional elements required for control, regulation and monitoring, such as regulating valves, control valves, pressure sensors, pressure switches, flow meters and the like are each fixedly installed in the tube system by means of screw connections.

This conventional arrangement is disadvantageous in that it requires a disproportionate amount of assembly time and a lot of space for the whole arrangement. Moreover, the change of individual functional elements or the insertion of additional functional elements is difficult and may eventually be realised only by changing the entire arrangement.

It is the object of the invention to provide an apparatus for directing, controlling and monitoring liquid streams, in particular for a membrane-type water treatment apparatus and a water treatment apparatus itself, which are designed in a space-saving and compact manner, require little time for assembly and repair work and provide easy operation while providing high versatility.

This object is achieved by an apparatus according to claim 1 and by a water conditioning apparatus according to claim 13, resp.

Further developments of the invention are defined in the subclaims.

Further features and advantages of the invention will be apparent from the description of embodiments in connection with the Figures. In the Figures.

Figure 1:
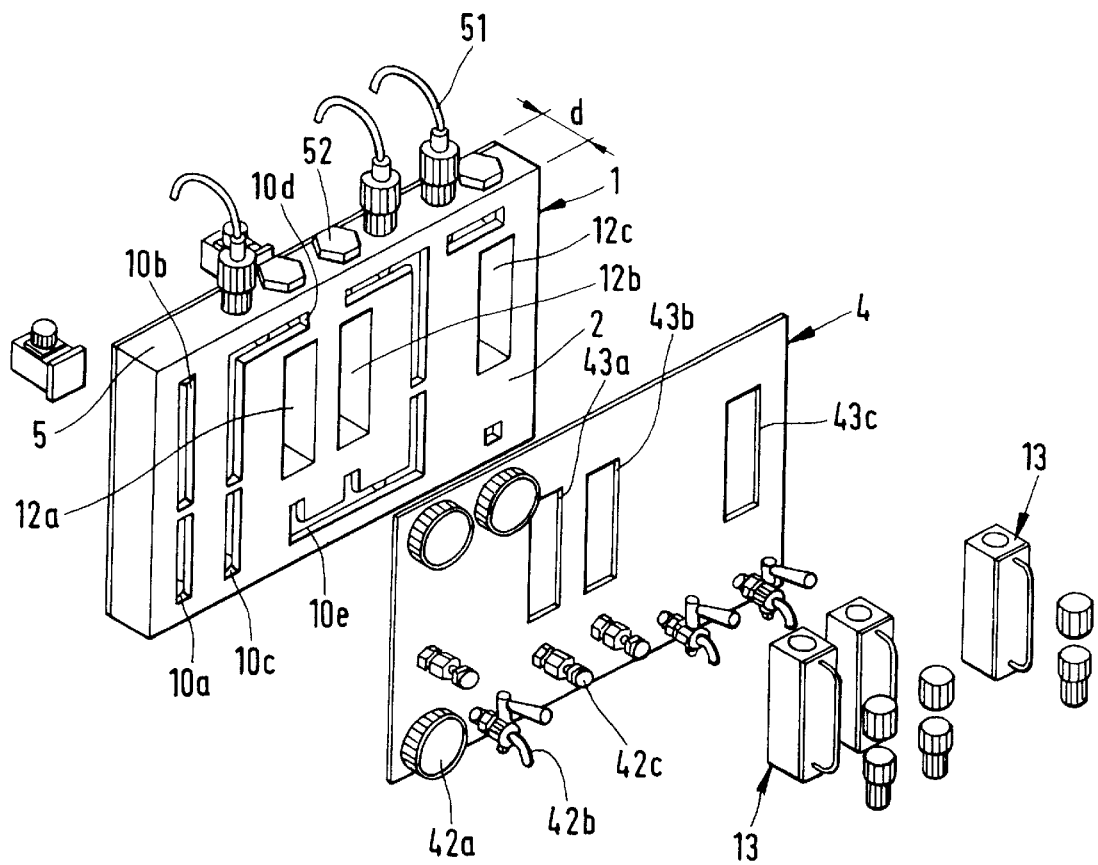
FIG. 1 is a perspective representation of the inventive apparatus seen from its front side, with the component parts being separated in the manner of an exploded representation.
Figure 2:
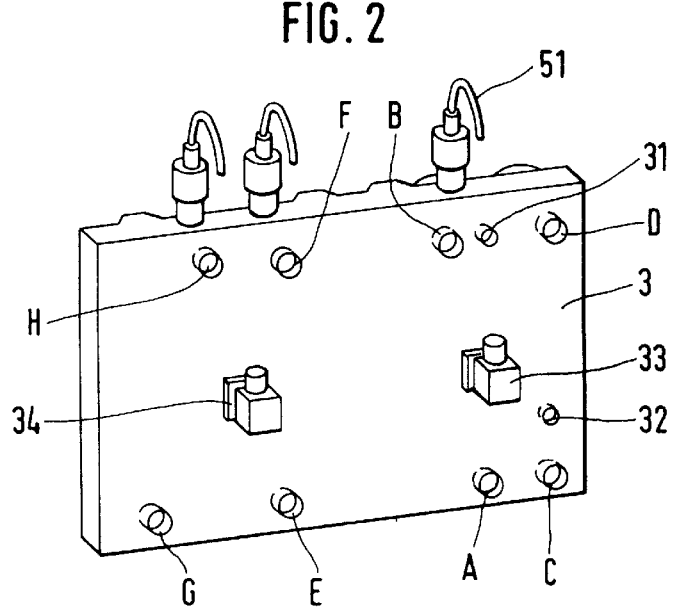
FIG. 2 is a perspective view of the inventive apparatus seen from the back side.
Figure 3:
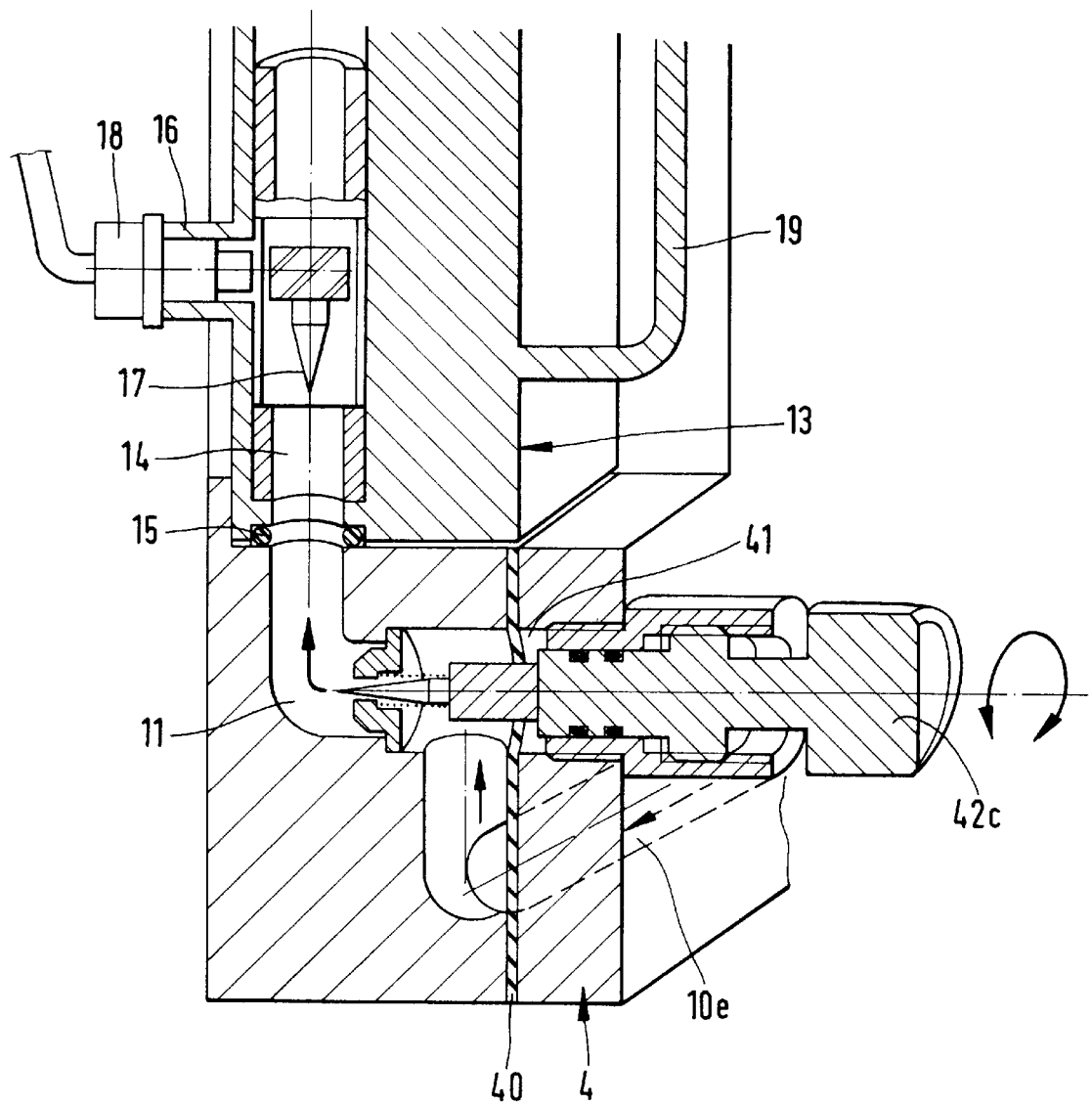
FIG. 3 is a partially sectional view of a portion of the inventive apparatus and FIG. 4 is a schematic representation of a membrane-type water conditioning apparatus wherein the flow channels are schematically indicated.

As shown in the FIGS. 1 to 3 the inventive apparatus comprises a plate-shaped main body 1 made of resin or metal and having a rectangular cross-section with a thickness d. The main body 1 has one plate surface, defined as front side 2, provided with a plurality of groove-shaped, elongate recesses or milled depressions 10a, 10b, 10c . . . each extending parallel to a respective one of the outer edges of the main body 1 and forming individual portions of flow channels for a liquid flowing in the main body 1. The recesses 10a 10b, 10c, . . . have a rectangular or circle segment-shaped cross-section. The main body is formed of red bronze or glass fibre reinforced resin, of brass (MS), of polypropylene-random (PP-R) or stainless-steel. When using MS or red bronze and highly concentrated waters the main body is upgraded or coated to match the medium.

Furthermore, the main body 1 has, in addition to the groove-shaped recesses 10a, 10b, . . . forming the flow channels, a number of further recesses 12a, 12b, 12c with rectangular cross-section, the recesses being formed at the front side 2 and having edges aligned parallel to the outer edges of the main body 1. The recesses 12a, 12b, 12c serve the purpose of receiving fittingly dimensioned slide members or receiver pieces 13 for instruments.

As shown in FIG. 2 the main body has, on its back surface 3 opposite to the front side 2, a plurality of connections A, B, C, D, E, F, G, H defined by apertures formed at predetermined positions in the back surface 3. The connections serve as liquid inlets and outlets.

Moreover, connections 31, 32, 33, 34 are provided at predetermined positions at the back surface for mounting measuring and control instruments.

A respective receiver piece 13 for a functional member for directing, controlling, regulating or monitoring the liquid stream is inserted in each of the recesses 12a, 12b, 12c. The contour of the receiver piece 13 corresponds to the respective recess. As shown in FIG. 3 the receiver piece 13 has a vertically extending flow channel 14 when inserted, whereby the ends of the flow channel communicate with predetermined channel portions at the front surface 2 of the main body 1 through flow channels 11 provided within the main body. For example, the receiver piece 13 shown in FIG. 3 serves for connecting the recesses or channel portions 10e and 10d shown in FIG. 1. The flow channel 14 of the receiver piece 13 is sealed, at the point of connection, to the main body 1, to prevent liquid from leaking to the surroundings by means of a gasket in the form of a rubber ring 15. The receiver piece 13 comprises, at its back surface opposite to the front side when inserted, a tubular lug 16 which extends through an aperture at the back surface 3 of the main body 1 and provides a communication between the back surface 3 and the flow channel 14. In the embodiment shown in FIG. 3 the receiver piece 13 comprises a turbine 17 mounted within the flow channel 14 and a sensor 18 provided at the backward lug. Receiver pieces having other functional members for controlling, regulating and monitoring the liquid stream, for example other types of valves, turbines or sensors, may be provided as required. Preferably, the receiver piece has a handle 19 provided at the side opposite to the lug 16 for pushing the receiver body into the recess and pulling it out therefrom.

Thus, the recesses 10a, 10b, 10c, . . . at the front side of the main body are connected through the receiver pieces 13, the flow channels 11 provided within the main body and the connections at the back side to form a defined channel system.

As shown in FIG. 2 a front plate 4 covers the front side 2 of the main body 1 having the recesses 10a, 10b, 10c, . . . . The front plate 4 has a contour corresponding to that of the main body 1 and is mounted thereto, for example by means of bolts, in a manner to be detachable but secured against rotation with respect to the main body.

The front plate 4 covers the recesses 10a, 10b, 10c, whereby a corresponding gasket 40 for preventing leakage of liquid from the channel portions 10a, 10b, 10c, . . . is arranged between front plate 4 and the edge of the corresponding recesses 10a, 10b, 10c, . . . . For example, the gasket is formed in the manner of rubber sealing rings.

Moreover, the front plate 4 has a plurality of apertures 41 at predetermined positions. Functional members 42a, 42b, 42c... for directing, controlling, regulating and monitoring water flowing through the flow channels of the main body, such as control valves, regulating valves, check valves, pressure gauges, pressure switches, flow meters and conductivity sensors as well as testing taps are mounted in the apertures 41. In FIG. 1 the functional member having the reference sign 42a is a pressure gauge, the functional member having the reference sign 42b is a testing tap and the functional member having the reference sign 42c is a valve.

The front plate 4 further comprises a plurality of apertures 43a, 43b, 43c corresponding to the recesses 12a, 12b, 12c of the main body 1 for exchanging the receiver pieces 13 by pulling them out and inserting them therethrough even if the front plate 4 is attached.

The main body 1 has additional apertures at the upper side 5 between the front side 2 and the back side 3. The further apertures communicate with the channel system within the main body, and comprise, for example, conductivity sensors 51 inserted therein or an adjusting member 52 securing the receiver piece 13.

According to a modified embodiment the main body 1 and the front plate 4 are made as a single cast part rather than in the form of two separate parts. This embodiment is particularly advantageous when using resin as a material.

Figure 4:
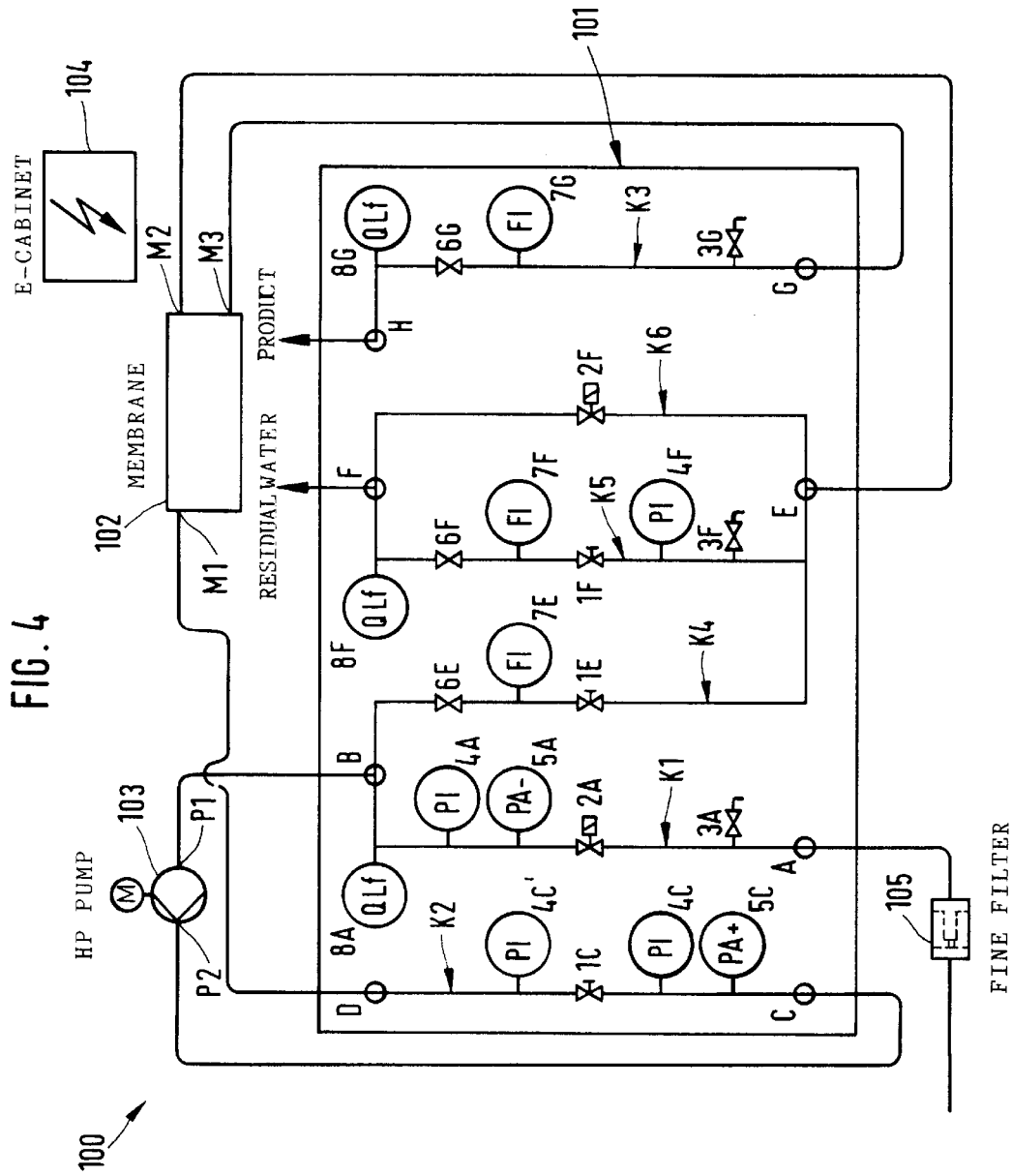

The inventive membrane-type water conditioning apparatus 100 is shown in FIG. 4. The water conditioning apparatus comprises a device 101 for directing, controlling, regulating and monitoring liquid streams which will be referred to in the following as control block 101. The water conditioning apparatus further comprises a membrane 102 having an inlet M1 and two outlets M2 and M3 for the liquid. A high pressure pump 103 having an inlet P1 and an outlet P2 is provided for producing the liquid pressure required for the flow over the membrane 102. Necessary electrical equipment for the apparatus is provided in a separate E-cabinet 104. A fine filter 105 is provided for prefiltering the entering untreated water.

The control block 101 has four inlets C, A, E and G as well as four outlets D, B, F, H. The inlet A communicates with the outlet B through a flow channel K1 within the control block 101, whereby the flow channel comprises the following devices or members in succession between the inlet A and the outlet B: a testing tap 3A, a solenoid valve 2A, a pressure switch 5A, a pressure gauge 4A and a conductivity sensor 8A. The outlet B is connected to the inlet P1 of the pump 103 and the outlet P2 of the pump 103 is connected to the inlet C. Moreover, the inlet C in the control block 101 communicates with the outlet D through a flow channel K. The following devices are arranged in the flow channel K2 in succession between the inlet C and the outlet D: A pressure switch 5C, a pressure gauge 4C, an adjusting valve 1C and a further pressure gauge 4C'.

The outlet D is connected to the inlet M1 of the membrane 102. The permeate discharging outlet M3 of the membrane 102 is connected to the inlet G of the control block 101. The inlet G communicates with the outlet H through a flow channel K3 provided within the control block 101. The following devices are arranged in the channel K3 in succession between G and H: a testing tap 3G, a flow meter 7G, a check valve 6G and a conductivity sensor 8G. The channel K3 serves for monitoring and discharging the permeate leaving the outlet M3 of the membrane as cleaned product.

The concentrate discharging outlet M2 of the membrane 102 is connected to the inlet E of the control block. The inlet E of the control block communicates with the outlet B through a flow channel K4 provided within the control block 101. The following devices are arranged in succession between the inlet E and the outlet B: an adjusting valve 1E, a flow meter 7E and a check valve 6E. The channel K4 serves for recycling a portion of the concentrate discharged from the outlet M2 of the membrane through the pump 103 to the membrane 102.

Moreover, the inlet E of the control block 101 communicates with the outlet F through a channel K5 provided within the control block. The following devices are arranged in succession between the inlet E and the outlet F: a testing tap 3F, a pressure gauge 4F, an adjusting valve 1F, a flow meter 7F, a check valve 6F and a conductivity sensor 8F. The channel K5 serves for discharging a portion of the concentrate leaving the membrane at the outlet M2 as residual water.

The inlet E further communicates with the outlet F through a further channel K6 formed in the control block 101. A solenoid valve 2F is provided in the channel K6. The channel K6 is required for flushing the membrane with untreated water after a stop or an interruption of the operation.

The control block 101 is in the form of the embodiment shown in the FIGS. 1 to 3. This means that all the channels extend at the surface of the main body or within the main body. The connections of the control block are provided at the back side of the main body, whereas the control, regulating and monitoring devices are provided at the front side to be clearly laid out and easily accessible for an operator. The operation of the membrane-type water treatment apparatus will be described in the following with reference to FIG. 4.

In operation the untreated water filtered in the fine filter 105 flows into the main body of the control block 101 through the connection A at the back side of the control block and passes the devices arranged in the channel K1, i.e. the testing tap 3A, the solenoid valve 2A, the pressure gauge 4A and the pressure switch 5A. The untreated water leaves the control block at outlet B as mixed water to enter the high pressure pump 103 which produces the required operating pressure.

The mixed water reenters the main body at the connection C on the back side of the control block. The pressurised mixed water is monitored and preadjusted by pressure switch 5C, the pressure gauge 4C, the adjusting valve 1C, the further pressure gauge 4C' and the conductivity sensor 8A and enters the membrane 102 through the outlet D at the back side of the control block.

The membrane separates the mixed water into two different qualities and amounts. One portion flows as product from the outlet M3 of the membrane into the main body through the connection G at the back side of the control block. This product portion is monitored by means of the testing tap 3G, the flow meter 7G, the check valve 6G and the conductivity sensor 8G and leaves the main body at the outlet H on the back side of the control block for further use.

The second portion leaving the membrane at the outlet M2 as concentrate flows into the main body at the connection E and is again divided into two different streams.

The main stream is admixed to the untreated water to guarantee the discharge flow at the membrane 102 through the channel K4, the adjusting valve 1E, the flow meter 7E and the check valve 6E. The recycling of a portion of the concentrate is required for keeping the discharge flow speed on the membrane constant, so that the membrane does not exhibit a filtering effect. This can increase the recovery to about 75%.

The smaller portion of the concentrate is discharged through the channel K5, the testing tap 3F, the pressure gauge 4F, the adjusting valve 1F, the flow meter 7F, the check valve 6F and the conductivity sensor 8F via the outlet F at the back side of the control block in order to prevent blockage of the system. This residual water is led to the drain.

When the membrane-type apparatus is stopped at the end of production or due to an interruption, the membrane 102 is flushed with untreated water through the connection E, the outlet F and the channel K6 with the solenoid valve 2F.

As apparent from the above description, an essential advantage of the described apparatus is the compact construction allowing an easy exchange of the measuring, controlling or regulating devices, in particular by providing the receiver pieces for functional members in the form of slide members. The fact that the control and regulating devices which must be adjusted by an operating person are clearly laid out on the front side allows for an easy operation by the user. When designing a channel system, certain additional loops can be provided which may then be selectively activated for particular applications by using valves.

In this manner the above-described control apparatus or the control block can also be used for other membrane-type water treatment apparatus, for example for nano filtration apparatus, ultra filtration apparatus and micro filtration apparatus. The described control system is particularly suitable for medium-size apparatus with a capacity of about 600 to 2000 l/h of product, but also for small apparatus with a capacity of about 50 to 500 l/h of product.

What is claimed is:

1. Apparatus for controlling, regulating, measuring or monitoring liquid streams for a water conditioning apparatus, comprising:
   a plate-shaped body having a plane surface with a plurality of recesses formed therein for forming flow channels for said liquid streams,
   plate means attached to said surface of said body to form fluid-tight flow channels,
   inlet and outlet means, provided in said plate-shaped body or in said plate means and communicating with said flow channels,
   a functional member communicating with said flow channels for directing, controlling, regulating or monitoring the liquid streams in said channels,
   a further recess formed in said plate-shaped body, and
   an insert member placed within the further recess for connecting at least two of the recesses of said plurality of recesses,
   said insert member comprising said functional member.

2. The apparatus of claim 1, wherein said plate shaped-body further comprises channel-shaped cavities formed in the interior of said plate-shaped body.

3. The apparatus of claim 2, wherein said inlet and outlet means comprise apertures formed in said plate-shaped body at a side thereof opposite to said plane surface, said apertures communicating with said plurality of recesses.

4. The apparatus of claim 3, wherein said plurality of recesses, said flow channels formed in the interior of said plate-shaped body and said apertures communicate with each other to form a channel system.

5. The apparatus of claim 1, comprising at least one aperture formed in said plate means, said aperture communicating with one of said recesses formed in said plane surface of said plate-shaped body, said functional member being disposed in one said at least one aperture.

6. The apparatus of claim 1, wherein said plate-shaped body is a cast part.

7. The apparatus of claim 1, wherein said plate-shaped body and said plate means are each formed as a single cast part.

8. The apparatus of claim 1, wherein said plate means comprises an aperture formed at a location and with a shape corresponding to said further recess for inserting and removing said insert member into said further recess therethrough.

9. The apparatus of claim 1, comprising sealing means arranged between said insert member and said plate-shaped body for sealing said insert member when inserted into said further recess.

10. The apparatus of claim 1, wherein said plate-shaped body is formed as a plate having a first thickness and said plate means is formed as a plate having a second thickness which is less than said first thickness.

11. The apparatus of claim 1, wherein said functional member is a control valve, a pressure gauge, a pressure switch, a flow meter, a regulating valve, a check valve or a conductivity sensor.

12. Use of an apparatus as defined in claim 1 for controlling a membrane-type water conditioning apparatus.

13. Water conditioning apparatus comprising:
   a membrane having a first membrane inlet, a first membrane outlet and a second membrane outlet,
   a pump having a pump inlet and a pump outlet and
   a control device formed as a control block having channels, first, second, third and fourth control block inlets and first, second, third and fourth control block outlets, the control block being formed in accord with the apparatus of claim 1, said channels comprising:
   a first channel formed in said control block for communicating said first control block inlet with said first control block outlet,
   a second channel formed in said control block for communicating said second control block inlet with said second control block outlet,
   a third channel formed in said control block for communicating said third control block inlet with said third control block outlet and
   a fourth channel formed in said control block for communicating said fourth control block inlet with said first control block outlet and
   a fifth channel formed in said control block for communicating said fourth control block inlet with said fourth control block outlet,
   the water conditioning apparatus further comprising:
   a conduit means connecting said first control block outlet with said pump inlet, a conduit means connecting said pump outlet with said second control block inlet,
   a conduit means connecting said second control block outlet with said membrane inlet, a conduit means connecting said first membrane outlet with said fourth control block inlet and a conduit means connecting said second membrane outlet with said third control block inlet.

14. The water conditioning apparatus of claim 13, wherein said control block inlets and said control block outlets are disposed on the same side of said control block.

15. The water conditioning apparatus of claim 14, comprising at least one controlling device, measuring device or regulating device for controlling, measuring, regulating or monitoring a liquid flowing in said channels formed in said control block, said at least one controlling, measuring or regulating device being disposed on a side of said control block opposite to the side where said control block inlets and outlets are disposed.

16. The water conditioning apparatus of claim 15, wherein said control block further comprises at least one further recess intersecting one of said first to fifth channels, said controlling, measuring or regulating device being formed as said insert member for insertion into said further recess.

17. The water conditioning apparatus of claim 13, wherein said control block is a single cast part.

18. The water conditioning apparatus of claim 13, wherein said control block is formed of a main body having said first to fifth channels formed in a surface thereof, and a plate attached to said surface for covering said channels.

19. An apparatus for controlling, regulating, measuring or monitoring liquid streams for a water conditioning apparatus, comprising:
   a one-piece body member comprising channels formed in the interior thereof for forming a channel system for the liquid streams, and an inlet and an outlet communicating said channel system,
   a functional member provided in said channel system for directing, controlling, regulating, measuring or monitoring said liquid streams in said channel system, and having at least two channels comprising two ends,
   a recess formed in said one-piece body member between said two ends, and
   an insert member placed within said recess for connecting the two ends,
   said insert member comprising said functional member.

20. The apparatus of claim 19, wherein said body member is a cast part.

21. A membrane-type water conditioning apparatus comprising a controlling, measuring, regulating, or monitoring apparatus as defined in claim 19.

22. Water conditioning apparatus comprising:
   a membrane having a first membrane inlet, a first membrane outlet and a second membrane outlet,
   a pump having a pump inlet and a pump outlet and
   a control device formed as a control block having channels, first, second, third and fourth control block inlets and first, second, third and fourth control block outlets, the control block being formed in accord with the apparatus of claim 19, said channels comprising:
      a first channel formed in said control block for communicating said first control block inlet with said first control block outlet,
      a second channel formed in said control block for communicating said second control block inlet with said second control block outlet,
      a third channel formed in said control block for communicating said third control block inlet with said third control block outlet,
      a fourth channel formed in said control block for communicating said fourth control block inlet with said first control block outlet, and
      a fifth channel formed in said control block for communicating said fourth control block inlet with said fourth control block outlet,
   the water conditioning apparatus further comprising:
      a conduit means connecting said first control block outlet with said pump inlet, a conduit means connecting said pump outlet with said second control block inlet,
      a conduit means connecting said second control block outlet with said membrane inlet, a conduit means connecting said first membrane outlet with said fourth control block inlet and a conduit means connecting said second membrane outlet with said third control block inlet.

* * * * *

UNITED STATES PATENT AND TRADEMARK OFFICE
CERTIFICATE OF CORRECTION

PATENT NO. : 6,136,196

DATED : October 24, 2000

INVENTOR(S) : Helmut Weinberger

It is certified that error appears in the above-identified patent and that said Letters Patent is hereby corrected as shown below:

ON THE TITLE PAGE
Item

[30]   Foreign Application Priority Data

Fed Rep Germany   197 04 656.8

Signed and Sealed this

Eighth Day of May, 2001

Attest:

NICHOLAS P. GODICI

Attesting Officer

Acting Director of the United States Patent and Trademark Office